UNITED STATES PATENT OFFICE.

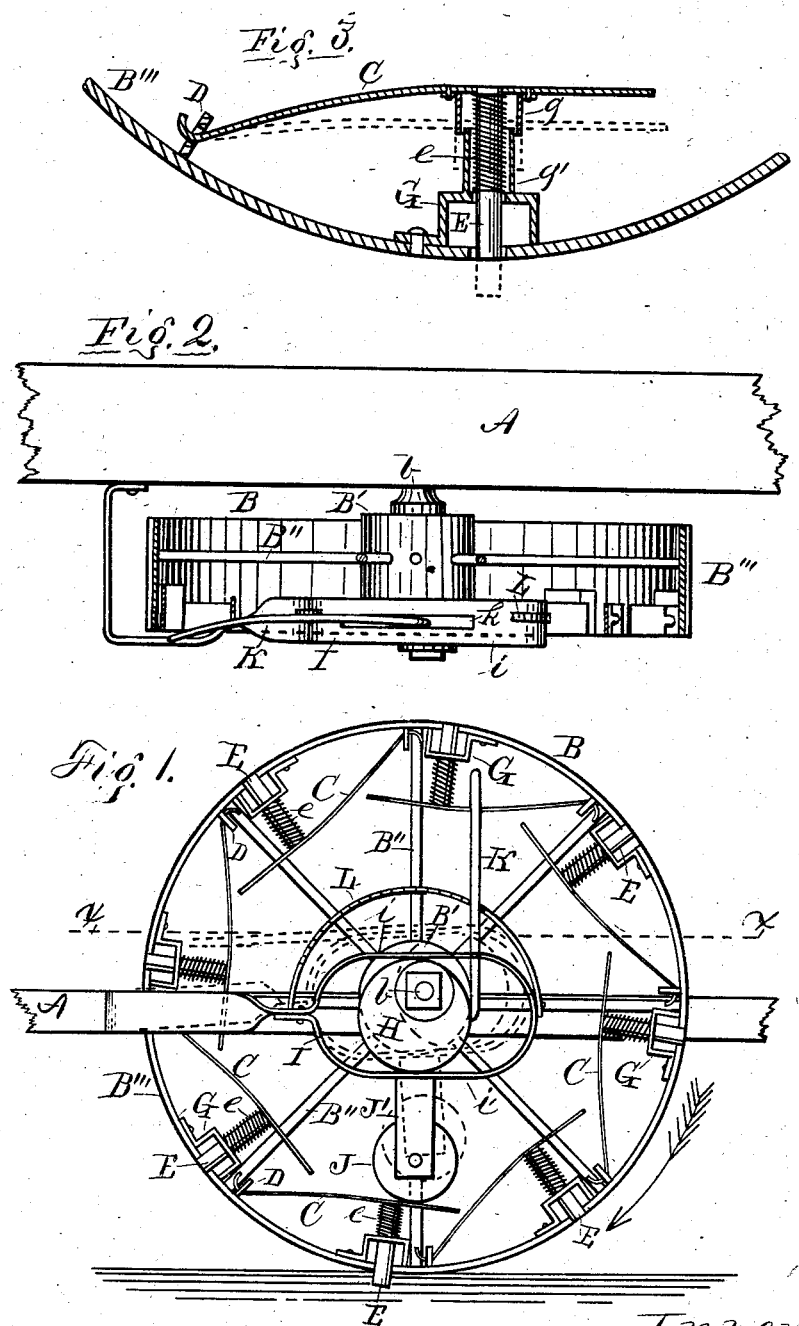

LEWIS HALL, OF METAMORA, ASSIGNOR OF ONE-FOURTH TO ANDREW G. SCHERER, OF PEORIA, ILLINOIS.

TRACTION-WHEEL.

SPECIFICATION forming part of Letters Patent No. 259,135, dated June 6, 1882.

Application filed March 2, 1882. (No model.)

*To all whom it may concern:*

Be it known that I, LEWIS HALL, a citizen of the United States, residing at Metamora, in the county of Woodford and State of Illinois, have invented certain new and useful Improvements in Traction-Wheels; and I do hereby declare the following to be a full, clear, and exact description of the invention, such as will enable others skilled in the art to which it appertains to make and use the same.

This invention relates to traction-wheels of that class in which radial spurs are used, which spurs are projected beyond the periphery of the wheel at the points of contact of the latter with the ground or other surface on which the wheel rolls, and which are retracted at the other points in the periphery not in contact with the ground; and the invention consists in the means employed for forcing the spurs outwardly through the peripheral parts of the wheel; in the means employed, in combination therewith, for retracting the spurs, and in the means employed for throwing the spur-actuating devices out of and into gear with the spurs, all as hereinafter described and claimed.

In the accompanying drawings, which illustrate a construction embodying my invention and form a part of this specification, Figure 1 is a side elevation. Fig. 2 is a sectional plan in the line $x\,x$ in Fig. 1. Fig. 3 is an enlarged sectional elevation of a detail and modification hereinafter referred to.

The same symbol hereinafter used as a representative of any particular part, whether said symbol is an accented or an unaccented letter, is also used as a mark of reference to designate the same part in the different figures of the drawings.

Letter A represents part of an ordinary frame adapted to be supported on a traction-wheel or set of wheels, B.

The wheel B is journaled on an axis, $b$, to the frame A. As shown in the drawings, the wheel B is formed of a hub, B', spokes B'', and rim B''', but may be constructed in any desired manner. The term "rim," as hereinafter used, will be understood to designate the felly and tire or periphery and adjacent parts of any construction of wheel.

C are cam-tracks, formed of plates or bars, hinged at one end to the rim of the wheel B and arranged with their other ends some distance inward from said rim. The hinge of each track C to the rim may be formed as desired; but I prefer it formed as shown—that is, by passing the rounded end of the cam-track through an eye in a standard, D, which projects inwardly from the rim B''', thus forming an effective hinge, one which permits ready removal of the cam-track when desired, and will allow the cam-track to yield endwise for purposes hereinafter described.

Near the distal end of each cam-track a spur, E, is secured thereto, which projects outwardly through a hole or short slot in the rim B'''. Each spur E also passes through a slot in a bent standard, G, which standard is also attached to the rim B'''. Each spur E is encircled by a spiral spring, $e$, located between its respective standard G and cam-track C, which spring is adapted to force the cam-track inward, and thereby retract the spur within the outer surface of the rim B''', as shown by full lines at Fig. 3, and by all of the spurs, except one, at Fig. 1. The standards G are intended principally as stays for the spurs and cam-tracks, and in the case of wheels having rims wide in a radial direction may be dispensed with. The spurs E may be protected from mud and other interfering rubbish by sleeves $g\,g'$, one of which is attached to the cam-track and the other to the standard G, and one of which is arranged to slide within the other, as plainly indicated at Fig. 3.

H is an eccentric journaled on an extension of the shaft on which the wheel B is journaled, but not so as to rotate with said wheel.

I is a bent arm, pivoted at I', at one end, to the frame A, and its other end slotted or formed otherwise into an upper limb, $i$, which rests above and in contact with the eccentric H, and a lower limb, $i'$, which rests below and in contact with said eccentric.

J is a cam-roller journaled in a stirrup or frame, J', which projects downwardly from the limb $i'$.

K is a lever secured at one end to the eccentric H, and its free end adapted to engage with a rack-bar, L. The lever K may pass upward at either side of the limb $i$; but I prefer to pass it through a slot, $k$, therein, as shown.

In operation, going forward, the wheel B is rotated by contact with the ground in the direction shown by the arrow at Fig. 1. The eccentric H being in position as shown by full lines at same figure, the cam-roller will be successionally brought into contact with the cam-tracks C as they are brought beneath it by the rotation of the wheel, and thereby force each spur E outward through the rim of the wheel and into the ground beneath it; and as each cam-track passes from beneath the cam-roller the respective spring connected therewith will force the cam-track inward, and thereby retract the spur E, also connected therewith. The hinge of the cam-track is such as to permit the cam-track to yield or move lengthwise, and thus obviate the necessity otherwise of curving the spurs to prevent them binding in their slideways. The free ends of the cam-tracks extending beyond their attachment to the spurs are at greater distances from the wheel-journal than are their points of attachment to said spurs, as shown more plainly at Fig. 3, and hence permit of rotating the wheel B backward in the evident manner, and at the same time operating the spurs as when the machine is moved forward.

By throwing the lever K rearward the limbs $i$ $i'$ and cam-roller J will be elevated, as shown by dotted lines at Fig. 1, so that the cam-tracks will not come in contact with the cam-roller when the wheel B is rotated.

The eccentric H may be journaled on the frame A, and then readily adapted to operate to raise and lower the cam-roller, as hereinbefore described.

Having thus described my invention, what I claim as new, and desire to secure by Letters Patent, is—

1. In a traction-wheel, in combination with cam-tracks having reciprocating spurs, a cam-roller adapted to act on said cam-tracks successionally, substantially as and for the purpose specified.

2. In a traction-wheel, in combination with hinged cam-tracks having spurs adapted to pass outward through the rim of the wheel, springs adapted to retract the spurs, substantially as and for the purpose specified.

3. In a traction-wheel, in combination with cam-tracks having reciprocating spurs and retracting-springs, cam-roller J, and oscillating bar I, having limbs $i$ $i'$, the eccentric H, adapted to force the cam-roller into contact with the cam-tracks and to raise it free therefrom, substantially as and for the purpose specified.

4. In a traction-engine, in combination with cam-tracks having reciprocating spurs and retracting-springs, cam-roller J, swinging bar I, having limbs $i$ $i'$, and eccentric H, the lever K, adapted to rotate said eccentric and operate the parts, substantially as and for the purpose specified.

5. In a traction-wheel, in combination with cam-tracks having reciprocating spurs, a swinging bar having a cam-roller adapted to actuate said cam-tracks and spurs, and an eccentric adapted to actuate said swinging bar and cam-roller, substantially as and for the purpose specified.

6. In combination with the swinging arm, carrying the cam-roller, and the eccentric for operating the swinging arm, the cam-tracks extended beyond their attachment to the spurs, substantially as and for the purpose specified.

7. In combination with the cam-roller and means for holding it, the cam-tracks extended beyond their points of attachment to the spurs, substantially as and for the purpose specified.

8. In a traction-wheel, in combination with a cam-roller, cam-tracks having spurs, said cam-tracks being hinged to the wheel, so as to permit of endwise movement of the cam-tracks and the use of straight spurs, substantially as and for the purpose specified.

In testimony whereof I hereto affix my signature in presence of two witnesses.

LEWIS HALL.

Witnesses:
ED. W. NEIFING,
ANDREW WEBER.